US012645931B2

(12) United States Patent     (10) Patent No.:   US 12,645,931 B2

Xu et al.     (45) Date of Patent:    Jun. 2, 2026

(54) SYSTEMS AND METHODS FOR DATA-AWARE STORAGE TIERING FOR DEEP LEARNING

(71) Applicant: HEWLETT PACKARD ENTERPRISE DEVELOPMENT LP, Houston, TX (US)

(72) Inventors: Cong Xu, Milpitas, CA (US); Suparna Bhattacharya, Bangalore (IN); Paolo Faraboschi, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1397 days.

(21) Appl. No.: 17/226,917

(22) Filed: Apr. 9, 2021

(65) Prior Publication Data

US 2022/0327376 A1     Oct. 13, 2022

(51) Int. Cl.
| | |
|---|---|
| *G06N 3/08* | (2023.01) |
| *G06F 16/21* | (2019.01) |
| *G06N 3/049* | (2023.01) |
| *G06N 3/063* | (2023.01) |

(52) U.S. Cl.
CPC ............. *G06N 3/08* (2013.01); *G06F 16/217* (2019.01); *G06N 3/049* (2013.01); *G06N 3/063* (2013.01)

(58) Field of Classification Search
CPC .......... G06N 3/049; G06N 3/063; G06N 3/08; G06F 16/217
See application file for complete search history.

(56) References Cited

U.S. PATENT DOCUMENTS

| | | | |
|---|---|---|---|
| 10,572,800 B2 | 2/2020 | Wang et al. | |
| 11,704,535 B1 * | 7/2023 | Vemuri | G06N 3/0464 706/31 |
| 2017/0228639 A1 | 8/2017 | Hara et al. | |
| 2019/0303765 A1 | 10/2019 | Gou et al. | |
| 2020/0342307 A1 | 10/2020 | Gou et al. | |
| 2022/0156276 A1 * | 5/2022 | Dain | G06N 20/00 |

OTHER PUBLICATIONS

Baptista et al., Raising the Abstraction Level of a Deep Learning Design on FPGAs, Nov. 2020. (Year: 2020).*

(Continued)

*Primary Examiner* — Marshall L Werner

(74) *Attorney, Agent, or Firm* — Sheppard Mullin Richter & Hampton LLP

(57)      ABSTRACT

Systems and methods are configured to split an epoch associated with a training dataset into a plurality of mini-epochs. A machine learning model can be trained with a mini-epoch of the plurality of mini-epochs. The mini-epoch can be, during the training, iterated for a number of times during the training. One or more metrics reflective of at least one of: a training loss, training accuracy, or validation accuracy of the machine learning model associated with the mini-epoch can be received. Whether to terminate iterations of the mini-epoch early before a number of iterations of the mini-epoch reaches the number of times based on the one or more metrics can be determined. The number of iterations can be a non-zero number.

20 Claims, 7 Drawing Sheets

(56)                    References Cited

OTHER PUBLICATIONS

Zhu et al., Entropy-Aware I/O Pipelining for Large-Scale Deep Learning on HPC Systems, 2018 IEEE International Symposium on the Modeling, Analysis, and Simulation of Computer and Telecommunication Systems, Sep. 2018. (Year: 2018).*

Peng et al., Optimus: An Efficient Dynamic Resource Scheduler for Deep Learning Clusters, EuroSys '18: Proceedings of the Thirteenth EuroSys Conference, No. 3, pp. 1-14, Apr. 2018. (Year: 2018).*

Nakandala, S. et al., "Cerebro: A Data System for Optimized Deep Learning Model Selection," Proceedings of the VLDB Endowment, 2020, pp. 2159-2173, vol. 13, issue 11, https://dl.acm.org/doi/pdf/10.14778/3407790.3407816, VLDB Endowment.

Fox et al., "Learning Everywhere: Pervasive Machine Learning for Effective High-Performance Computation", IEEE International Parallel and Distributed Processing Symposium Workshops (IPDPSW), Feb. 27, 2019, 9 pages.

Jae Duk Seo, "[Archived Post ] Andrew Ng: Deep Learning, Self-Taught Learning and Unsupervised Feature Learning", available online at <https://medium.com/@SeoJaeDuk/archived-post-andrew-ng-deep-learning-self-taught-learning-and-unsupervised-feature-learning-7c5bf24207b7>, Dec. 27, 2018, 16 pages.

Katharopoulos et al., "Not All Samples Are Created Equal: Deep Learning with Importance Sampling", Proceedings of the 35th International Conference on Machine Learning, 2018, 13 pages.

Kumar et al., "Quiver: An Informed Storage Cache for Deep Learning", 18th USENIX Conference on File and Storage Technologies, Feb. 25-27, 2020, 15 pages.

Meng et al., "Convergence Analysis of Distributed Stochastic Gradient Descent with Shuffling", 31st Conference on Neural Information Processing Systems (NIPS 2017), Sep. 29, 2017, 19 pages.

Mohan et al., "Analyzing and Mitigating Data Stalls in DNN Training", Jan. 19, 2021, 22 pages.

Yang et al., "Accelerating Data Loading in Deep Neural Network Training", IEEE International Conference on High Performance Computing, Data and Analytics (HiPC), Oct. 2, 2019, 11 pages.

Zhu et al., "Entropy-Aware I/O Pipelining for Large-Scale Deep Learning on HPC Systems", IEEE International Symposium on the Modeling, Analysis, and Simulation of Computer and Telecommunication Systems, 2018, pp. 145-156.

* cited by examiner

100

| Accelerators |
|:---:|
| 102 |

PERFORMANCE TIER
104

| MINI-EPOCH$_i$ | MINI-EPOCH$_{i+1}$ |
|:---:|:---:|
| 106 | 108 |

C1 = performance tier
B1 = performance tier
bandwidth

CAPACITY TIER
110

| EPOCH |
|:---:|
| 112 |

C2 = capacity tier
B2 = capacity tier
bandwidth

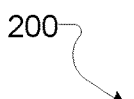
200
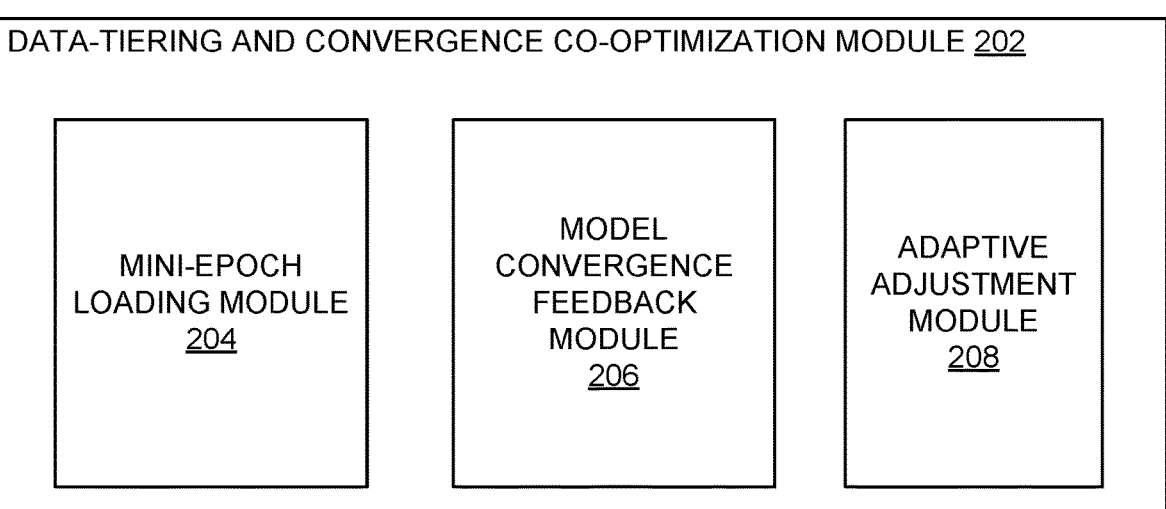
DATA-TIERING AND CONVERGENCE CO-OPTIMIZATION MODULE 202
MINI-EPOCH LOADING MODULE 204
MODEL CONVERGENCE FEEDBACK MODULE 206
ADAPTIVE ADJUSTMENT MODULE 208
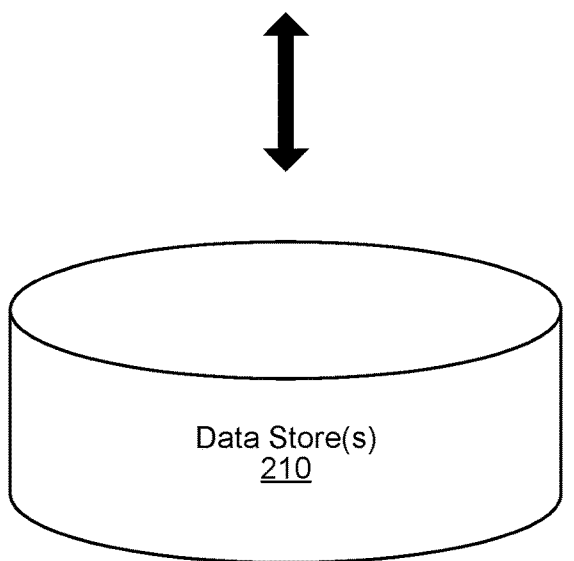
Data Store(s) 210
FIG. 2

Accuracy num_shards_16/repeatching_factor_32/validation
num_shards_2/repeating_factor_16/validation
num_shards_32/repeating_factor_32/validation
num_shards_320/repeating_factor_64/validation num_shards_4/repeating_factor_8/validation
num_shards_8/repeating_factor_32/validation Number of thousand iterations

450

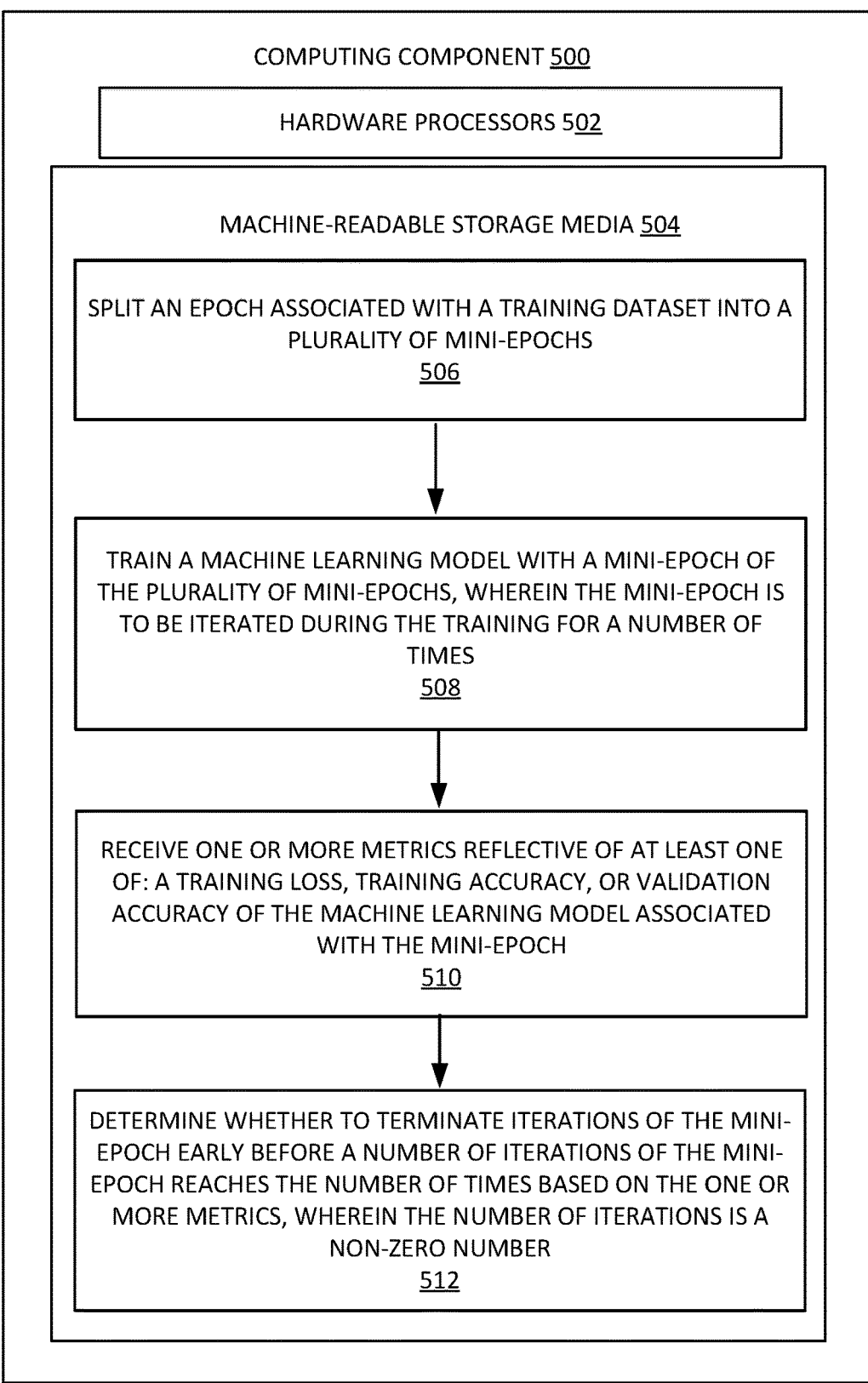

COMPUTING COMPONENT 500

HARDWARE PROCESSORS 502

MACHINE-READABLE STORAGE MEDIA 504

SPLIT AN EPOCH ASSOCIATED WITH A TRAINING DATASET INTO A PLURALITY OF MINI-EPOCHS
506

TRAIN A MACHINE LEARNING MODEL WITH A MINI-EPOCH OF THE PLURALITY OF MINI-EPOCHS, WHEREIN THE MINI-EPOCH IS TO BE ITERATED DURING THE TRAINING FOR A NUMBER OF TIMES
508

RECEIVE ONE OR MORE METRICS REFLECTIVE OF AT LEAST ONE OF: A TRAINING LOSS, TRAINING ACCURACY, OR VALIDATION ACCURACY OF THE MACHINE LEARNING MODEL ASSOCIATED WITH THE MINI-EPOCH
510

DETERMINE WHETHER TO TERMINATE ITERATIONS OF THE MINI-EPOCH EARLY BEFORE A NUMBER OF ITERATIONS OF THE MINI-EPOCH REACHES THE NUMBER OF TIMES BASED ON THE ONE OR MORE METRICS, WHEREIN THE NUMBER OF ITERATIONS IS A NON-ZERO NUMBER
512

FIG. 5

SYSTEMS AND METHODS FOR DATA-AWARE STORAGE TIERING FOR DEEP LEARNING

FIELD

Embodiments of the disclosure relate to reducing machine learning (ML) training time through reducing stalls caused by input/output (IO) bottlenecks of a multi-tier storage. Further, embodiments of the disclosure relate to addressing convergence issues based on model convergence feedback.

BACKGROUND

Deep Neural Network (DNN) models trained with very large datasets can perform rich deep learning tasks with high accuracy. Feeding huge volumes of training data can exert significant pressure on IO subsystems. Generally, training data is loaded in random order from an entire dataset on every training iteration to achieve model convergence. The conventional training does not sufficiently reuse the training data that have been loaded for a ML job over multiple iterations but, rather, loads new training data from the entire dataset. Further, the conventional training does not optimally use IO subsystems that comprises multiple tiers of storage with different read throughput for each tier. For example, the entire dataset can be maintained on a capacity tier that provides large capacity but slow read throughput. When training data is randomly selected from the entire dataset, selected data may not have been cached (or otherwise read into) in a performance tier and cause stalls. Reading the randomly selected training data from the capacity tier instead of the performance tier can significantly impact training efficiency. Thus, improved systems and methods to optimally use multiple-tier storage systems are desired.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a block diagram of an example data-tiering and convergence co-optimization module, according to embodiments of the present disclosure.

FIG. 5 depicts a set of executable instructions stored in machine-readable storage media that, when executed, cause one or more hardware processors to perform an illustrative method for reducing stalls caused by IO bandwidth without sacrificing model convergence, according to embodiments of the present disclosure.

Figure 1:
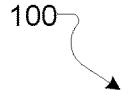
FIG. 1 is a block diagram of an exemplary multiple-tier storage system, according to embodiments of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Advancements in computational capabilities for training deep neural networks (DNN) favor larger models trained on increasingly bigger datasets to achieve results with significant improvements in accuracy than was possible before. The datasets are made even bigger with simulated data. In some cases, these datasets can be in the range of terabytes or even petabytes.

Such datasets are, more often than not, too large to be stored on a performance tier storage (e.g., solid state disks (SSDs)) that provides greater bandwidth (e.g., read throughput) than a capacity tier storage (e.g., hard disk drives (HDDs), cloud storage, or the like) that provides greater size but lesser bandwidth. Ideally, an entire dataset should fit on the performance tier to keep powerful artificial intelligence (AI) accelerators (e.g., computing elements, including any number of CPUs, GPUs, or any combination thereof, that are designed to execute training jobs) or other specialized hardware accelerators busy without any downtime. However, various considerations, including cost concerns, cause such ideal scenario impractical. Further, the immense improvements in AI accelerators today resulted in massive IO bandwidth requirements for the AI accelerators. As an example, training different convolutional neural networks (CNNs) on 8 NVidia A100 GPUs in a single compute node requires up to 130 GB/s of IO bandwidth to keep the GPUs busy. Thus, the massive IO bandwidth requirement has become a scalability bottleneck for AI training.

Current training algorithms and related methodologies do not address the scalability bottleneck. For example, a mini-batch stochastic descent training algorithm iterates through an entire data set in a different random order for every epoch. The algorithm issues requests to IO subsystems to reload data from a capacity tier to a performance tier for each epoch and causes performance to be limited by bandwidth of the capacity tier, which is far less than the consumption rates of AI accelerators. A study on data stalls in DNN training shows that, when no more than 35% of an entire data set can be cached on a performance tier, 10%-70% of epoch time may be spent blocked on IO fetch stalls.

Several researchers have explored strategies that are less wasteful of IO bandwidth. However, effectiveness of optimizations proposed depend not just on system performance characteristics but also on characteristics of the dataset and influence on model convergence. Accordingly, there exists a need for systems and methods that intelligently cache data on the performance tier and effectively address any model convergence issues that may arise from the intelligent caching.

An improved approach rooted in computer technology can reduce stalls caused by IO bandwidth without sacrificing model convergence. Based on computer technologies, the disclosed technology can provide co-optimizing the data tiering and iteration scheme for machine learning (ML) training with a systematic approach that is (1) bandwidth aware, (2) model convergence conscious, and (3) data sample influence aware. The disclosed technology can effectively address dual challenges of (1) providing sustained read throughput for AI accelerators that matches the required IO bandwidth and (2) introducing the disclosed technology with minimal disruption to current ML pipelines.

FIG. 1 is a block diagram 100 of an exemplary multiple-tier storage system, according to embodiments of the present disclosure. The block diagram 100 illustrates one or more accelerators 102, a performance tier 104, and a capacity tier 110. The performance tier 104 can comprise at least one or more storage components (e.g., memory) that provides a quicker read throughput but generally has less capacity than one or more storage components of the capacity tier 110. Conversely, the capacity tier 110 can comprise at least one storage components (e.g., memory) that provides a slower read throughput but generally has greater capacity than the one or more storage components of the performance tier 104. Some example storage components of the performance tier 104 can include SSDs, local nvme SSDs, or the like. Some example storage components of the capacity tier 110 can include parallel file systems, cloud storages, or the like. In some embodiments, the performance tier 104 and/or the capacity tier 110 can be provided as storage service(s) on a cloud and can be accessed by the one or more accelerators 102 over a network.

The block diagram 100 denotes a capacity of the performance tier 104 C1 and its bandwidth B1. Further, the block diagram 100 denotes a capacity tier of the capacity tier 110 C2 and its bandwidth B2. Some plausible values for the B1, B2, C1, and C2 are:

C1=7.4 petabytes;

C2=250 petabytes;

C1/C2 storage capacity ratio=0.03;

B1=26.1 terabytes/second;

B2=2.5 terabytes/second; and

B1/B2 read throughput ratio=10.4.

As the example C1/C2 ratio suggests, the capacity tier 110 can provide storage capacity that is orders of magnitude greater than storage capacity of the performance tier 104. The capacity tier 110 can store a dataset used for ML training (e.g., training). The dataset can be maintained by the capacity tier 110. In some embodiments, the dataset can be the entire dataset or the dataset can be a subset of the entire dataset made available for the training.

A ML job can process the dataset multiple times (e.g., the ML job makes multiple full passes of the dataset). Each such full pass of the dataset is an epoch 112. Thus, the epoch 112 can have a size of the dataset. The ML job can involve multiple epoch-iterations over the dataset.

For each epoch-iteration, the epoch 112 (or data thereof) can be split into multiple mini-epochs 106, 108. Data in each mini-epoch 106 can be processed multiple times (e.g., up to a "repeating factor" further described below) before moving to the next mini-epoch 108. The ML job can involve multiple mini-epoch-iterations over the same mini-epoch.

For each mini-epoch-iteration, the mini-epoch 106, 108 (or the data thereof) can be split into multiple mini-batches. Data in each mini-batch can be processed together by the one or more accelerators 102 before moving to the next mini-batch for the next mini-batch-iteration.

As an example, an epoch can be the entire dataset which contains 1,000,000 images (e.g., training data). A mini-epoch can contain 100,000 images if the epoch is split into 10 mini-epochs. A mini-batch can be a subset of the mini-epoch that contains 1,000 images. Each mini-batch can be fetched at every iteration. If a different mini-batch is selected for each mini-batch-iteration of the ML job, it would take 100 iterations to complete a mini-epoch.

The example block diagram 100 illustrates two mini-epochs (i.e., a first mini-epoch$_i$ and second mini-epoch$_{i+1}$) 106, 108 stored in the performance tier 104. A total number of mini-epochs can depend on various factors including C1/C2 storage capacity ratio and/or read throughputs B1, B2. Generally, each mini-epoch has a size equal to or less than half of the performance tier 104 storage capacity C1 (i.e., 0.5*C1). The mini-epoch size requirement is to ensure that at least two mini-epochs can be completely loaded into the performance tier 104 at one time.

By splitting of an epoch 112 into mini-epochs 106, 108, during the training with a mini-epoch (e.g., the mini-epoch$_i$ 106), the next mini-epoch (e.g., mini-epoch$_{i+1}$ 108) can be prefetched from the capacity tier 110 into the performance tier 104. Since the mini-epoch size requirement specifies that each mini-epoch to be of equal or less than half the size of the performance tier 104, both the mini-epoch 106 and next mini-epoch 108 can both be loaded in the performance tier 102 simultaneously. So long as the accelerators 102 are training a ML model with the mini-epoch 106, the next mini-epoch 108 can be prefetched without causing IO bottleneck stalls. Data in the next mini-epoch 108 can be readied for use by the accelerators 102 when the accelerators 102 are done training the ML model with the mini-epoch 106. More details on how the splitting an epoch into multiple mini-epochs are provided in relation to the mini-epoch loading module 204 of FIG. 2.

In some embodiments, the mini-epochs can have overlapping data. For such mini-epochs, each mini-epoch could have a size that is greater than the half of the performance tier 104. Again, the mini-epoch size requirement is to ensure that more than two mini-epochs can be completely loaded into the performance tier 104 at one time, overlapping or otherwise.

To reduce/avoid the IO bottleneck and to fully utilize data of the mini-epoch 106 for model convergence, the one or more accelerators 102 can perform/execute multiple mini-epoch iterations of the same ML job on the data while the next mini-epoch 108 is prefetched. For example, the accelerators 102 may iterate over the mini-epoch 106 a "repeating factor" number of times. A higher repeating factor can reduce IO bandwidth demand by increasing training duration for the mini-epoch 106 and reducing immediate need for the next mini-epoch 108. Thus, the higher repeating factor can free up IO bandwidth demand for other nodes and applications that share the same storage (e.g., the performance tier 102 or the capacity tier 110).

The repeating factor can be selected based on desired IO reduction for the multi-tier storage. Assume that the accelerators 102 can read data from the performance tier 102 at an effective bandwidth of EB1 and the performance tier 102 can read data from the capacity tier 110 at a bandwidth of B2. If the repeating factor is set to EB1 divided by B2 (e.g., EB1/B2) or greater, stalls caused by IO bandwidth can be fully eliminated. In other words, for a repeating factor at or above EB1/B2, the accelerators 102 can train a ML model reusing data of the mini-epoch 106 while prefetching of the next mini-epoch 108 completes.

For example, the use of the repeating factor can be achieved with use of existing APIs (e.g., Tensorflow Dataset "repeat" API). While Tensorflow API is provided as an example, other ML frameworks including Pytorch and Cognitive Tookit (CNTK) can provide similar APIs that can be utilized to minimally modify existing ML applications for the same purpose.

FIG. 2 is a block diagram 200 of an example data-tiering and convergence co-optimization module 202, according to embodiments of the present disclosure. The data-tiering and convergence co-optimization module 202 can include a mini-epoch loading module 204, a model convergence feedback module 206, and an adaptive adjustment module 208. The data-tiering and convergence co-optimization module 202 can provide various functions relating to reducing stalls caused by IO bandwidth without sacrificing model convergence. As one function, the data-tiering and convergence co-optimization module 202 can split an epoch into multiple mini-epochs and prefetch the next mini-epoch while training a ML model with a mini-epoch. As another function, the data-tiering and convergence co-optimization module 202 can acquire/receive model convergence feedback during the training. In some embodiments, the model convergence feedback can be acquired/received with a callback function. As yet another function, the data-tiering and convergence co-optimization module 202 can adaptively adjust various parameters during the training to reduce bias caused by the training the ML model with mini-epochs. The modules in this figure and all figures herein are exemplary only, and other implementations may include additional, fewer, integrated or different components. Some modules may not be shown so as not to obscure relevant details.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a network computing device or on a server. For example, one or more modules and/or applications described herein, or at least a portion thereof, can be implemented as or within an application (e.g., app), a program, or an applet, etc., running on network computing device or system. The network computing device or system can be one or more hubs, repeaters, bridges, switches, routers, gateways, or the like. In another example, one or more modules and/or applications, or at least a portion thereof, can be implemented using one or more computing devices or systems that include one or more servers, such as network servers or cloud servers. It should be understood that there can be many variations or other possibilities.

The mini-epoch loading module 204 can be configured to split an epoch into multiple mini-epochs and prefetch the next mini-epoch while training a ML model progresses with a mini-epoch. The splitting of an epoch into mini-epochs and use of a repeating factor can be added to existing ML applications with minimal code change. For example, the splitting can be achieved with use of existing APIs (e.g., Tensorflow Dataset "split" API). There are many alternative ways to implement the mini-epochs including using Tensorflow Dataset "window" API.

In some cases, sizes of mini-epochs may not be uniform. In those cases, other APIs including Tensorflow Dataset "take" API and "skip" API may be used to modify existing ML applications with few lines of additional code. While Tensorflow API is provided as an example, other ML frameworks including Pytorch and Cognitive Tookit (CNTK) provide similar APIs that can be utilized to minimally modify existing ML applications for the same purpose. The mini-epoch loading module 204 can track sizes of each mini-epoch.

In some embodiments, the mini-epoch loading module 204 can monitor training progress with a mini-epoch and/or prefetching progress of the next mini-epoch. The monitored process can be used by the mini-epoch loading module 204 to instruct the data-tiering and convergence co-optimization module 202 when to start using the next mini-epoch for training. For example, one or more pointers can indicate which mini-epoch to use in training and (1) when a repeating factor described in relation to FIG. 1 is reached and (2) when the next mini-epoch has been fully loaded, modify the one or more pointers to direct the data-tiering and convergence co-optimization module 202 to use the next mini-epoch for further training.

The model convergence feedback module 206 can be configured to acquire/receive model convergence feedback during the training. In some embodiments, the model convergence feedback can be acquired/received with a callback function.

While the splitting an epoch into multiple mini-epochs and adding repeated factor for a mini-epoch can eliminate IO bandwidth bottlenecks as discussed above, the repeated use of the mini-epoch in training can introduce some convergence concerns. First, data in a particular mini-epoch is likely to have more bias than data in the epoch. Thus, repeated use of the mini-epoch may introduce some bias in a trained model. Further, the repeated use can overfit the trained model to the mini-epoch. The disclosed technology can address these issues with model convergence feedback.

The disclosed technology can provide model convergence feedback through monitoring of various performance metrics associated with training a ML model during a training with the mini-epoch 106 of FIG. 1. For example, training loss, training accuracy, validation accuracy, and/or other performance metrics can be monitored. The performance metrics can be monitored during and/or at the end of each mini-epoch. In some embodiments, a score can be calculated based on a combination of one or more monitored performance metrics.

In some embodiments, the repeated training with the mini-epoch 106 can be terminated early based on the model convergence feedback. For example, where the repeating factor specifies N number of repeated training with the mini-epoch, if the model convergence feedback indicates that a ML model is (1) no longer converging, (2) no longer converging at a desirable rate, or (3) overfitting is occurring, the repeated training can stop early and wait until the next mini-epoch 108 of FIG. 1 is fully loaded before continuing the training with the next mini-epoch.

In some embodiments, the model convergence feedback can be implemented as a callback function. For example, the model convergence feedback can be implemented as a Tensorflow training callback. In the callback, combinations of different performance metrics can be explored and an optimal combination can be selected to provide the model convergence feedback. As an example combination, a simple linear combination of training loss, training error, and validation error can be used to construct a score which can represent the model convergence feedback. An example code for the example combination follows below:

```
loss = logs.get("loss")
training_error = 1 - logs.get("accuracy")
validation_error = 1 - logs.get("val_accuracy")
metrics = np.array([loss, training_error, validation_error"])
current_score = np.dot(self.score_weights, metrics)
if np.less(current_score, self.score):      # record the weights if current result is
    self.score = current_score               # better (e.g., less) than previous score
    self.wait = 0                            # that is maintained
else:                                        # if the current result is worse,
    self.wait += 1                           # stop iterating over this mini-epoch and move
    if self.wait >= self.wait_th:            # to the next mini-epoch after prefetching time
```

The above code is for illustrative purpose only and many different combinations of performance metrics and various implementations are possible.

The adaptive adjustment module 208 can be configured to adaptively adjust repeating factor or size(s) of mini-epoch(s) during the training. In some embodiments, an optimal strategy can be identified during the training based on the model convergence feedback. A strategy can include a particular mini-epoch size and/or a particular repeating factor that are associated with a particular model convergence feedback. In some embodiments, a mini-epoch size can be adjusted based on the model convergence feedback. Additionally, the repeating factor can be adjusted based on the model convergence feedback. Thus, an optimal strategy can include a set of mini-epoch size and/or repeating factor that results in a trained ML model completed in a shorter time but exhibits comparable model convergence to another model trained with an epoch without use of the disclosed technology. The optimal strategy can be stored in a data store 210 and used for subsequent training runs that use a given dataset and model.

It should be noted that the terms "optimize," "optimal" and the like as used herein can be used to mean making or achieving performance as effective or perfect as possible. However, as one of ordinary skill in the art will recognize, perfection cannot always be achieved. Accordingly, these terms can also encompass making or achieving performance as good or effective as possible or practical under the given circumstances, making or achieving performance better than that which can be achieved with other settings or parameters, or making or achieving performance within acceptable bounds with an optimized strategy. In the context of the present disclosure an optimal strategy can refer to a set of parameters that provide the shortest training completion time. However, other embodiments contemplated by the disclosed technology can be optimized in accordance with one or more other and/or alternative metrics criteria and not limited to just the shortest training completion time. For example, resource cost (e.g., cost to compute) may be another metric or criterion upon which to perform optimization. The degree of optimization can also be varied in accordance with user needs/desires.

Usually the model convergence feedback exhibits more sensitivity to the repeating factor at early phases during the training. As a result, as long as model convergence feedback is unaffected (or affected within reasonable limits, which can be determined based on boundary threshold values), the repeating factor can be adaptively adjusted based on the model convergence feedback. For example, if the model convergence feedback module 206 detects that the convergence exhibits little sensitivity to the repeating factor, the adaptive adjustment module 208 may adaptively increase the repeating factor to a larger value. On the other hand, if the model convergence feedback module 206 detects that the convergence exhibits too much sensitivity to the repeating factor, the adaptive adjustment module 208 may adaptively decrease the repeating factor to a smaller value.

When allowed to be increased, a greater repeating factor can be advantageous in that it can enable prefetching of the next mini-epoch at a rate that is lower than B1 discussed in relation to FIG. 1. Further, allowance of the greater repeating factor (e.g., a high repeating factor tolerance) can indicate that not all data in an epoch are needed or important. Thus, some importance-based sampling techniques can be applied, thereby greatly reducing training time and computing resource usage while providing the same or similar quality ML model.

In some instances, each mini-epoch may exhibit a different repeating factor tolerance. If the impact of the repeating factor on convergence speed fluctuates across mini-epochs, more states/parameters can be tracked with mini-epoch level granularity to enable adaptive repeating factor adjustments to each mini-epoch. For example, parameters reflecting an accuracy change before each mini-epoch and/or an accuracy change after each mini-epoch can be tracked to enable adaptive repeating factor adjustments with mini-epoch granularity. In some embodiments, prefetching rate may also be adaptively adjusted for each mini-epoch based on the model convergence feedback and/or tracked states.

In some instances, too large of a repeating factor for a mini-epoch may introduce undesirable bias to the training. The model convergence feedback can be used to detect existence of such bias. In some instances, the bias can be detected based on comparison(s) of model convergence feedback(s) between two or more mini-epochs. The bias can be addressed at least by (1) composing each mini-epoch randomly in each mini-epoch-iteration to reduce the bias and/or (2) increasing a size of a mini-epoch to reduce the bias at mini-epoch-iterations. In some embodiments, strategies for addressing such bias through adaptively adjusting mini-epoch size(s) and/or the repeating factor can be implemented as one or more co-optimization policies.

As shown in FIG. 2, the data-tiering and convergence co-optimization module 202 can be configured to communicate with a data store 210. The data store 210 can be configured to store and maintain various types of data to support the functionality of the data-tiering and convergence co-optimization module 202. For example, the data store 210 can store and maintain various performance metrics including training loss, training accuracy, validation accuracy, a score that combines one or more performance metrics, model convergence feedback, various states, repeating factor, prefetching rate, size(s) of mini-epoch(s), or the like. Further, optimal strategy/policy/configurations can be stored and maintained by the data store 210. Accordingly, the data store 210 can support various functionalities of the mini-epoch loading module 204, model convergence feedback module 206, and adaptive adjustment module 208.

Figure 3:
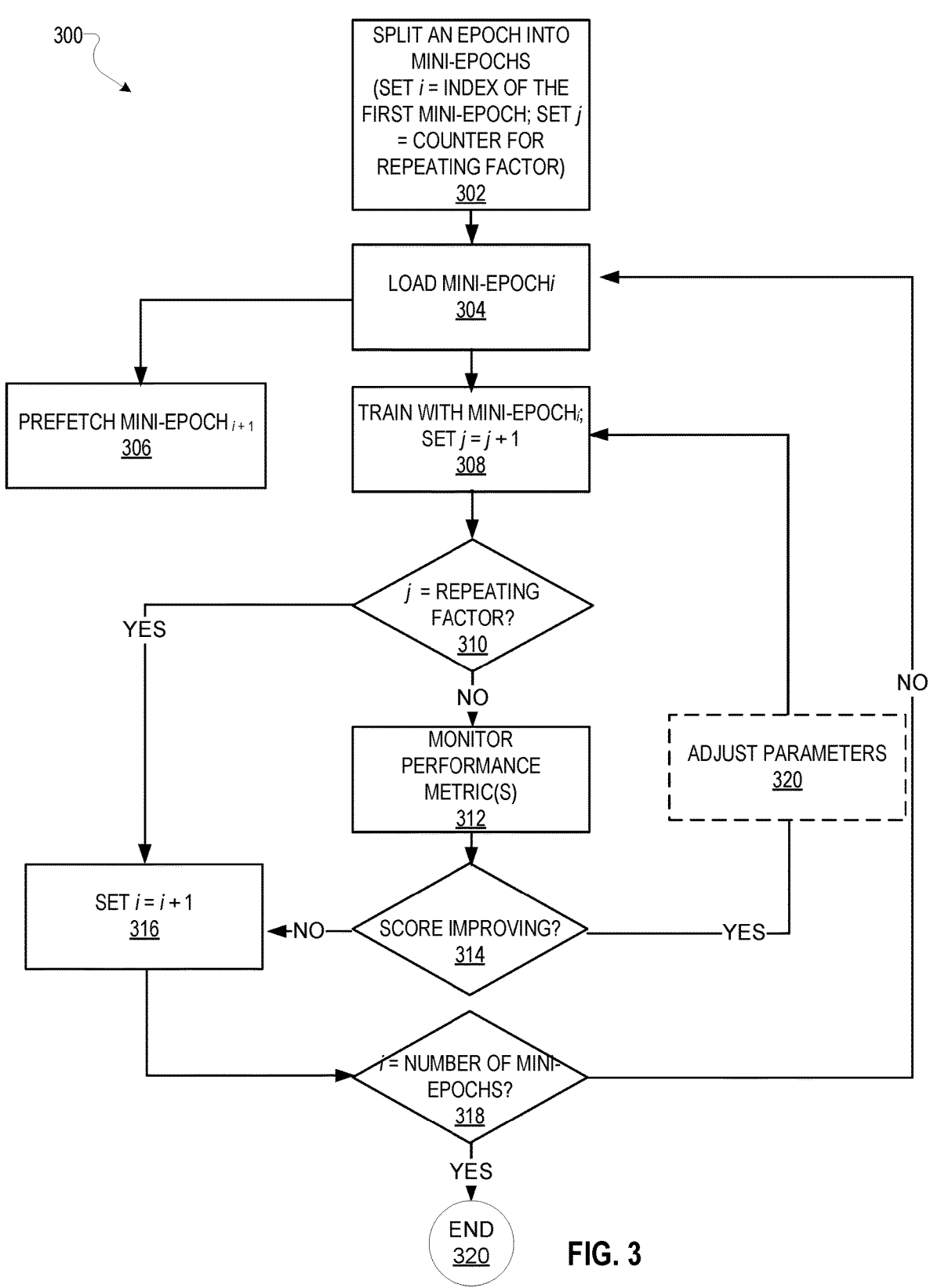
FIG. 3 is an example sequence diagram illustrating operations of the data-tiering and convergence co-optimization module of FIG. 2, according to embodiments of the present disclosure.

FIG. 3 is an example sequence diagram 300 illustrating operations of the data-tiering and convergence co-optimization module 202 of FIG. 2, according to embodiments of the present disclosure.

At 302, an epoch can be split into mini-epochs as discussed in relation to FIGS. 1 and 2. Further, two indexes i, a counter for mini-epoch used in training, and j, a counter for the repeating factor of FIG. 1 can provided. Initially, i can be set to an index of the first mini-epoch and j can be set to zero or one according to an indexing scheme used for the counter j.

At 304, a mini-epoch associated with the counter for mini-epoch i (i.e., mini-epoch$_i$) can be loaded into the performance tier 102 of FIG. 1 for training. If the operation is performed for the first time in the training, the loaded mini-epoch can be the first mini-epoch.

At 306, the next mini-epoch (i.e., mini-epoch$_{i+1}$) can be prefetched into the performance tier 102 of FIG. 1. In some embodiments, the prefetching (and loading that follows) of the next mini-epoch can be performed in parallel to the loading of the mini-epoch$_i$ at 304.

At 308, a ML model can be trained with the mini-epoch$_i$. Further, the counter j for the repeating factor can be incremented when the training with the mini-epoch$_i$ is complete or in progress.

At 310, the counter j can be compared against the repeating factor to determine whether another training with the mini-epoch$_i$ should be performed/executed. If the counter j has not yet reached the repeating factor, then the operations can proceed to 312 where one or more performance metrics can be monitored. Model convergence feedback discussed in FIG. 2 can be determined based on the one or more performance metrics. In some embodiments, the monitoring of the one or more performance metrics 312 can be performed during the training with the mini-epoch$_i$ at 308.

At 314, whether the one or more performance metrics indicate improved model convergence can be determined. If the ML model is converging as desired (e.g., a score indicative of model convergence is improving), then the training can be repeated with the mini-epoch$_i$ at 308.

Further, based on the one or more performance metrics, one or more parameters can be optionally adjusted at 320 in accordance with the adaptive adjustment module 208 of FIG. 2. As discussed above, the one or more parameters can include a size of a mini-batch and/or the repeating factor. The adjustments can remove undesirable bias that may be introduced with training the ML model with the mini-epochs.

At 314, if model convergence is no longer improving (e.g., the score is not improving) with additional training using mini-epoch$_i$, the operations can proceed to 316 to increment the counter i used to index the mini-epochs. Further, if the counter j for the repeating factor has reached the repeating factor at 310, then the operations can also proceed to 316 to increment the counter i used to index the mini-epochs. Incrementing the counter i can cause the operations to load the next mini-epoch (e.g., mini-epoch$_{i+1}$) at 304 and prefetch a mini-epoch that follows the next mini-epoch (e.g., mini-epoch$_{i+2}$) at 306.

At 318, whether the counter i for indexing mini-epochs has reached a number of total mini-epochs can be determined. If the counter i has not yet reached the number of total mini-epochs, the operations can proceed to 304 as discussed. If the counter i has reached the number of total mini-epochs, then the operations can proceed to terminate at 320.

The example sequence diagram 300 is for illustrative purpose only and the operations can be performed in various orders and in various combinations.

Figure 4A:
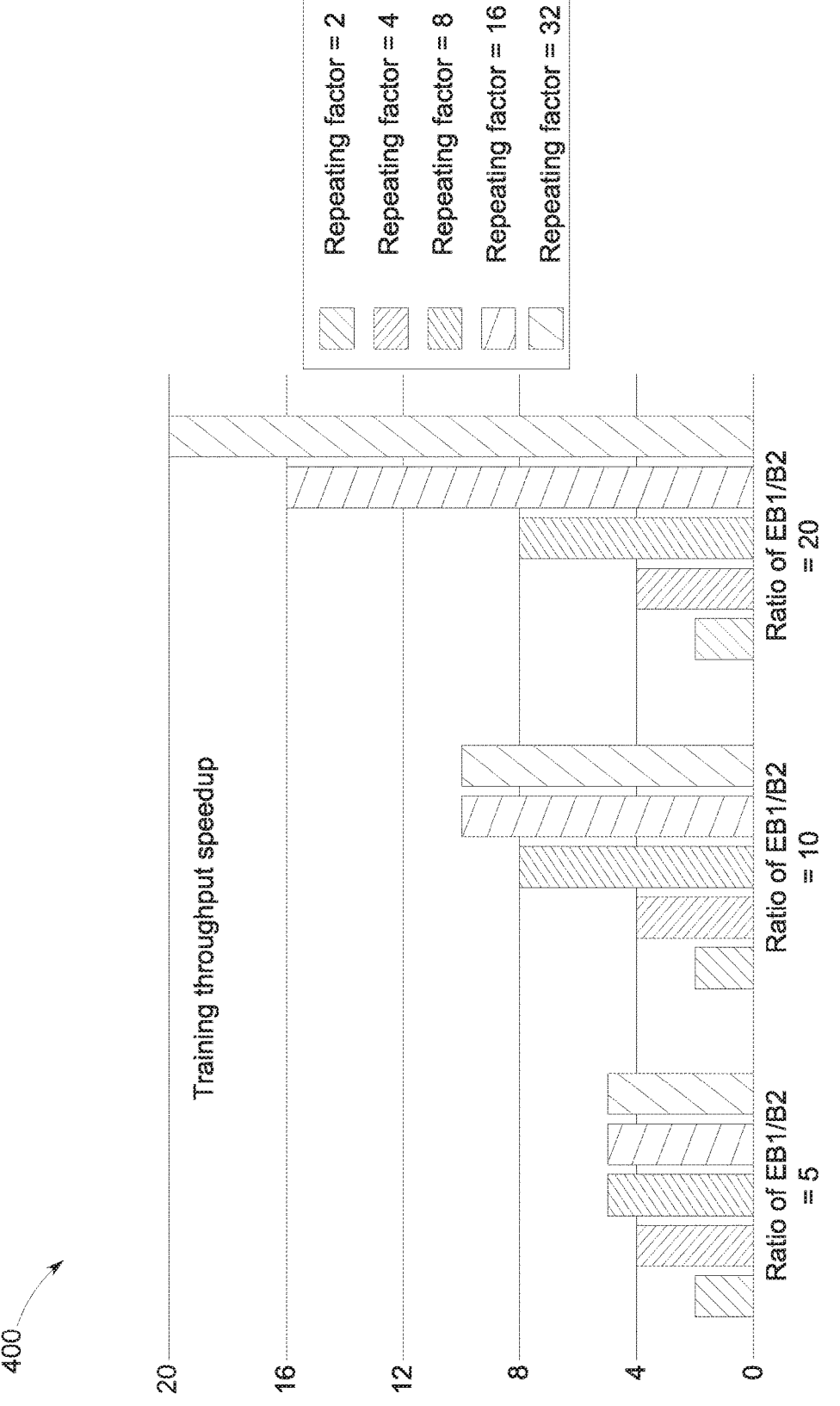
FIGS. 4A-4B are illustrations of performance enhancements enabled by the data-tiering and convergence co-optimization module of FIG. 2, according to embodiments of the present disclosure.
Figure 4B:
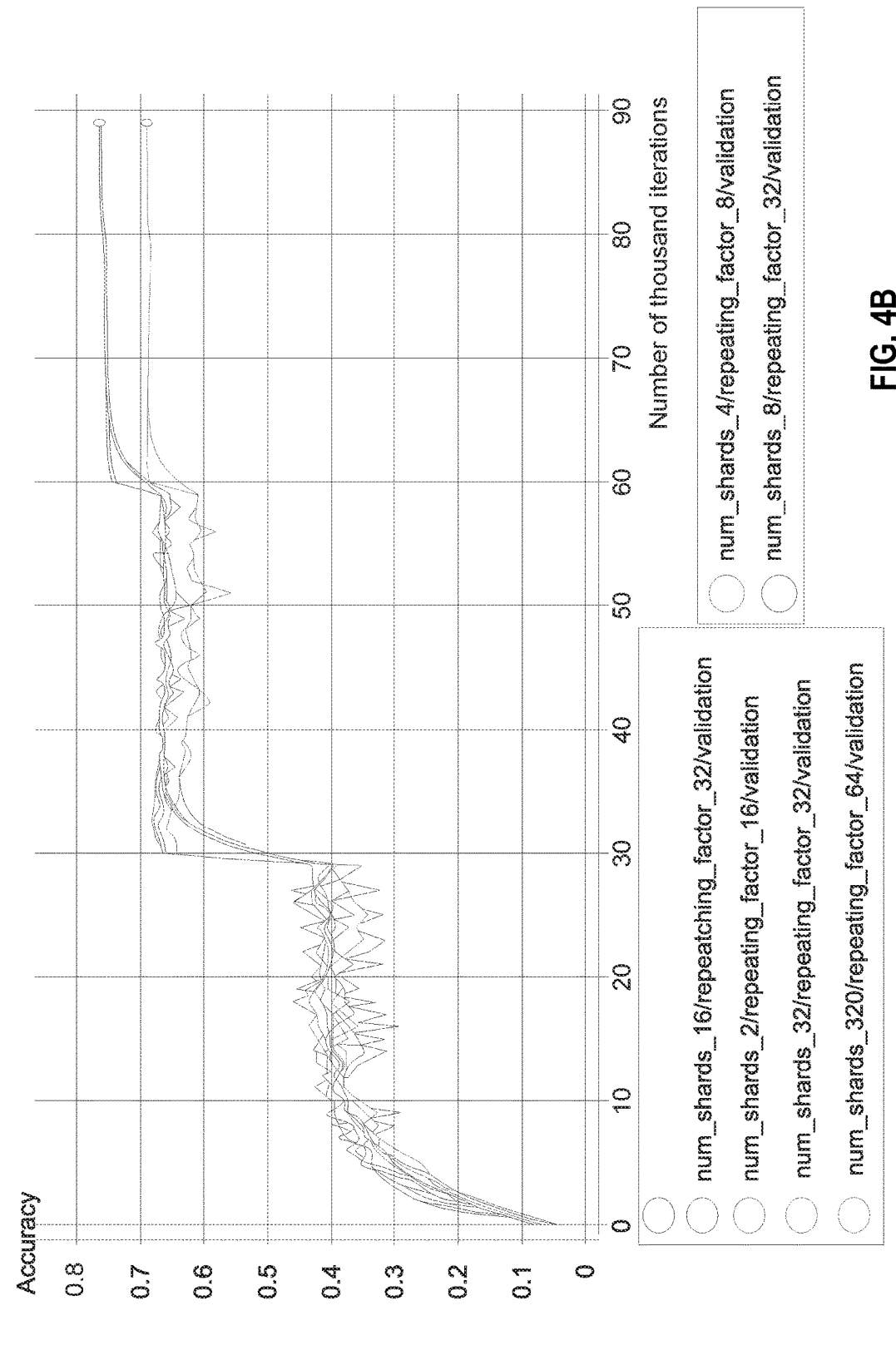

FIGS. 4A-4B are illustrations of performance enhancements enabled by a data-tiering and convergence co-optimization module, according to embodiments of the present disclosure. Specifically, FIG. 4A illustrates a chart 400 of different IO bandwidths (e.g., EB1/B2 ratios) and training throughputs measured using different repeating factors. As discussed, EB1 is an effective bandwidth of the one or more accelerators 102 of FIG. 1 and B2 is a bandwidth of the capacity tier 110 of FIG. 1.

As the chart 400 illustrates, where a repeating factor is less than EB1/B2 (i.e., EB1 divided by B2), stalls are caused by IO bandwidth. In such cases, the one or more accelerators 102 complete iterations on training data of a mini-epoch at a rate faster than the next mini-epoch is prefetched from the capacity tier 110 into the performance tier 102 of FIG. 1. Thus, the one or more accelerators 102 are left waiting for the prefetching of the next mini-epoch to complete so that the training can continue. Accordingly, the training throughput speedup is not exhibited.

On the other hand, where the repeating factor is greater than EB1/B2, the stalls caused by the IO bandwidth are eliminated. In other words, the training can complete the repeating factor number of trainings with the mini-epoch before loading the next mini-epoch to continue training.

FIG. 4B illustrates a chart 450 of training accuracy measured over training with different combinations of a number of mini-epochs (e.g., a number of "shards" in TensorFlow API terminology) and repeating factors. Here, the training accuracy is compared against a baseline accuracy of a ML model trained using an entire dataset for ResNet-50. The chart 450 illustrates that training with mini-epochs using the disclosed technology can achieve the same level, or substantially same level, of accuracy as the baseline as long as the number of mini-epochs (e.g., less than or equal to 32) and the repeating factors are within reasonable ranges (e.g., less than or equal to 32).

When the number of mini-epochs is grossly large (e.g., 320) and the repeating factor also grossly large (e.g., 64), then few percentage points of accuracy could be lost. However, the grossly large numbers are atypical in common scenarios. Further, the model convergence feedback and early termination mechanism discussed in relation to FIG. 2 can help gain some accuracy back.

While the chart 450 illustrates performance of the disclosed technology for ResNet-50, the disclosed technology can be applied to various ML applications including video analytics, natural language processing platforms, or the like. Accordingly, it is contemplated that the disclosed technology can be generalized to various applications.

FIG. 5 depicts a computing component 500 that includes one or more hardware processors 502 and machine-readable storage media 504 storing a set of machine-readable/machine-executable instructions that, when executed, cause the hardware processors 502 to perform an illustrative method for reducing stalls caused by IO bandwidth without sacrificing model convergence. The computing component 500 may be, for example, the computing system 600 depicted in FIG. 6 or another computing device described herein. The hardware processors 502 may include, for example, the processor(s) 604 depicted in FIG. 6 or any other processing unit described herein. The machine-readable storage media 504 may include the main memory 606, the read-only memory (ROM) 608, the storage 610, or any other suitable machine-readable storage media described herein.

At block 506, in example embodiments, instructions may be executed by the hardware processors 502 to split an epoch associated with a training dataset into a plurality of mini-epochs.

At block 508, in example embodiments, instructions may be executed by the hardware processors 502 to train a ML model with a mini-epoch of the plurality of mini-epochs. The mini-epoch is to be iterated during the training for a number of times.

At block 510, in example embodiments, instructions may be executed by the hardware processors 502 to receive one or more metrics reflective of at least one of: a training loss, training accuracy, or validation accuracy of the ML model associated with the mini-epoch.

At block 512, in example embodiments, instructions may be executed by the hardware processors 502 to determine whether to terminate iterations of the mini-epoch early before a number of iterations of the mini-epoch reaches the number of times based on the one or more metrics. The number of iterations is a non-zero number.

Figure 6:
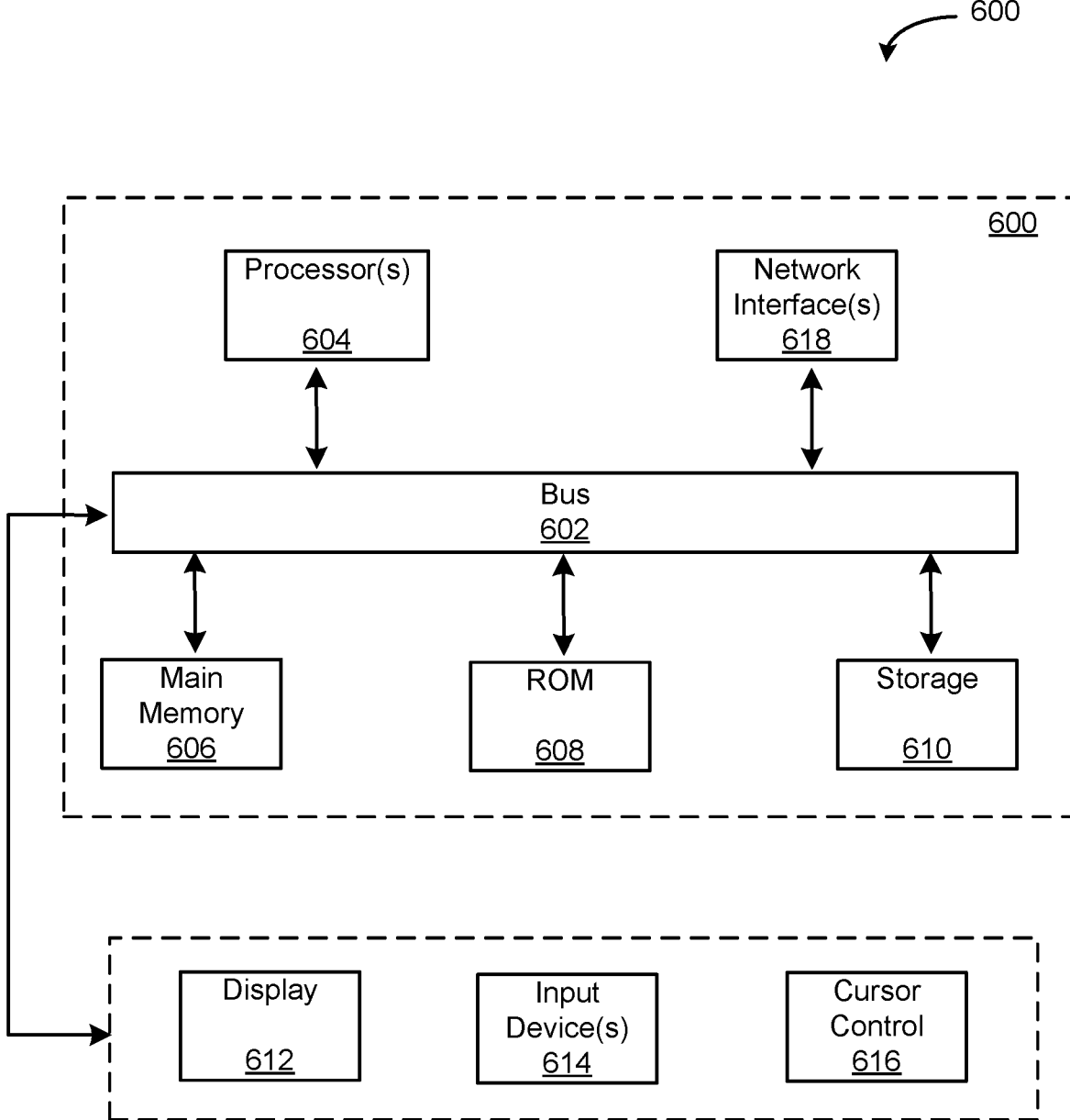
FIG. 6 is an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Any of the aforementioned engines or modules can be embodied as a computing component of the computing system 600. For example, the data-tiering and convergence co-optimization module 202, mini-epoch loading module 204, model convergence feedback module 204, and adaptive adjustment module 206 of FIG. 2 can be embodied as a computing component of the computing system 600.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Some forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH memory, NVRAM, any other memory chip or cartridge, and networked versions of the same. The non-transitory media can also include any special-purpose circuits or circuits that can be configured for the special purpose, such as FPGAs and ASICs.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

What is claimed is:

1. A computer-implemented method comprising:

splitting, by a computing system, an epoch associated with a training dataset stored in a capacity tier of memory into a plurality of mini-epochs;

training, by the computing system, a machine learning model with a mini-epoch of the plurality of mini-epochs, wherein the mini-epoch is to be iterated during the training for a number of times reflected in a repeating factor, wherein a performance tier of the memory stores the mini-epoch;

receiving, by the computing system, one or more metrics reflective of at least one of: a training loss, training accuracy, or validation accuracy of the machine learning model associated with the mini-epoch;

determining, by the computing system, whether to terminate iterations of the mini-epoch early before a number of iterations of the mini-epoch reaches the number of times based on the one or more metrics, wherein the number of iterations is a non-zero number; and prefetching a different mini-epoch from the capacity tier into a remaining portion of the performance tier unoccupied by the mini-epoch enabling execution of the number of iterations at the performance tier while the different mini-epoch is prefetched such that input-output stalls are avoided or reduced while maintaining machine learning model convergence by reducing input-output bandwidth demand in accordance with the repeating factor, and freeing the input-output bandwidth demand for nodes or applications sharing one of the capacity tier or the performance tier of the memory.

2. The method of claim 1, further comprising:

accessing the performance tier of memory that is coupled with at least one computing element designated to execute the training; and accessing the capacity tier of memory that is coupled with the performance tier, wherein the performance tier has faster read throughput than the capacity tier.

3. The method of claim 2, wherein the mini-epoch has a size that is smaller than or equal to half of the total capacity of the performance tier.

4. The method of claim 2, wherein the at least one computing element includes at least one hardware accelerator that is coupled with the performance tier.

5. The method of claim 2, wherein:

the at least one computing element consumes data at an effective bandwidth rate (EB1), the capacity tier provides data at a read throughput rate (B2), and the number of times is greater than or equal to EB1 divided by B2 (EB1/B2).

6. The method of claim 2, further comprising:

determining that the machine learning model has been trained with the mini-epoch for the number of times; and training the machine learning model with the different mini-epoch, wherein during the training the machine learning model with the different mini-epoch, prefetching the next different mini-epoch into the performance tier unoccupied by the different mini-epoch.

7. The method of claim 2, further comprising:

calculating a score based on a combination of the one or more metrics, wherein the determining whether to terminate the iterations of the mini-epoch early before the number of iterations of the mini-epoch reaches the number of times based on the one or more metrics comprises:

determining that the score does not improve during the training the machine learning model with the mini-epoch; and terminating the training the machine learning model with the mini-epoch.

8. The method of claim 7, further comprising:

waiting until the prefetching the different mini-epoch completes;

after completion of the prefetching the different mini-epoch, training the machine learning model with the different mini-epoch.

9. The method of claim 7, further comprising:

determining that the score is dependent upon the number of times during the training of the machine learning model with the mini-epoch; and adjusting the number of times based on the one or more metrics.

10. The method of claim 1, further comprising:

determining that more than a threshold level of bias is added during the training of the machine learning model with the mini-epoch; and composing a different mini-epoch with random selection of training data in the different mini-epoch; or increasing a size of the different mini-epoch.

11. A system comprising:

at least one processor; and a memory storing instructions that, when executed by the at least one processor, cause the system to perform a method comprising:

splitting, by a computing system, an epoch associated with a training dataset stored in a capacity tier of memory into a plurality of mini-epochs;

training a machine learning model with a mini-epoch of the plurality of mini-epochs, wherein the mini-epoch is to be iterated during the training for a number of times reflected in a repeating factor, wherein a performance tier of the memory stores the mini-epoch;

receiving one or more metrics reflective of at least one of: a training loss, training accuracy, or validation accuracy of the machine learning model associated with the mini-epoch;

determining whether to terminate iterations of the mini-epoch early before a number of iterations of the mini-epoch reaches the number of times based on the one or more metrics, wherein the number of iterations is a non-zero number; and prefetching a different mini-epoch from the capacity tier into a remaining portion of the performance tier unoccupied by the mini-epoch enabling execution of the number of iterations at the performance tier while the different mini-epoch is prefetched such that input-output stalls are avoided or reduced while maintaining machine learning model convergence by reducing input-output bandwidth demand in accordance with the repeating factor, and freeing the input-output bandwidth demand for nodes or applications sharing one of the capacity tier or the performance tier of the memory.

12. The system of claim 11, wherein the instructions cause the system to perform the method further comprising:

accessing the performance tier of memory that is coupled with at least one computing element designated to execute the training; and accessing the capacity tier of memory that is coupled with the performance tier, wherein the performance tier has faster read throughput than the capacity tier.

13. The system of claim 12, wherein the mini-epoch has a size that is smaller than or equal to half of the total capacity of the performance tier.

14. The system of claim 12, wherein the at least one computing element includes at least one hardware accelerator that is coupled with the performance tier.

15. The system of claim 12, wherein:

the at least one computing element consumes data at an effective bandwidth rate (EB1), the capacity tier provides data at a read throughput rate (B2), and the number of times is greater than or equal to EB1 divided by B2 (EB1/B2).

16. A non-transitory computer-readable storage medium including instructions that, when executed by at least one processor of a computing system, cause the computing system to perform a method comprising:

training a machine learning model with a mini-epoch of the plurality of mini-epochs, wherein the mini-epoch is to be iterated during the training for a number of times reflected in a repeating factor, wherein individual mini-epochs of the plurality of mini-epochs being associated with a training dataset stored in a capacity tier of memory, wherein a performance tier of the memory stores the plurality of mini-epochs;

receiving one or more metrics reflective of at least one of: a training loss, training accuracy, or validation accuracy of the machine learning model associated with the mini-epoch;

determining whether to terminate iterations of the mini-epoch early before a number of iterations of the mini-epoch reaches the number of times based on the one or more metrics, wherein the number of iterations is a non-zero number; and prefetching a different mini-epoch from the capacity tier into a remaining portion of the performance tier unoccupied by the mini-epoch enabling execution of the number of iterations at the performance tier while the different mini-epoch is prefetched such that input-output stalls are avoided or reduced while maintaining machine learning model convergence by reducing input-output bandwidth demand in accordance with the repeating factor, and freeing the input-output bandwidth demand for nodes or applications sharing one of the capacity tier or the performance tier of the memory.

17. The non-transitory computer-readable storage medium of claim 16, wherein the instructions cause the system to perform the method further comprising:

accessing the performance tier of memory that is coupled with at least one computing element designated to execute the training; and accessing the capacity tier of memory that is coupled with the performance tier, wherein the performance tier has faster read throughput than the capacity tier.

18. The non-transitory computer-readable storage medium of claim 17, wherein the mini-epoch has a size that is smaller than or equal to half of the total capacity of the performance tier.

19. The non-transitory computer-readable storage medium of claim 17, wherein the at least one computing element includes at least one hardware accelerator that is coupled with the performance tier.

20. The non-transitory computer-readable storage medium of claim 17, wherein:

the at least one computing element consumes data at an effective bandwidth rate (EB1), the capacity tier provides data at a read throughput rate (B2), and the number of times is greater than or equal to EB1 divided by B2 (EB1/B2).

* * * * *